US009274850B2

(12) United States Patent
Gohad et al.

(10) Patent No.: US 9,274,850 B2
(45) Date of Patent: Mar. 1, 2016

(54) PREDICTIVE AND DYNAMIC RESOURCE PROVISIONING WITH TENANCY MATCHING OF HEALTH METRICS IN CLOUD SYSTEMS

(75) Inventors: Atul A. Gohad, Satara (IN); Karthikeyan Ponnalagu, Madurai (IN)

(73) Assignee: International Business Machines Corporation, Armonk, NY (US)

(*) Notice: Subject to any disclaimer, the term of this patent is extended or adjusted under 35 U.S.C. 154(b) by 1028 days.

(21) Appl. No.: 13/417,052

(22) Filed: Mar. 9, 2012

(65) Prior Publication Data

US 2013/0138806 A1 May 30, 2013

Related U.S. Application Data

(63) Continuation of application No. 13/306,283, filed on Nov. 29, 2011, now abandoned.

(51) Int. Cl.
*G06F 15/173* (2006.01)
*G06F 9/50* (2006.01)
*H04L 12/26* (2006.01)

(52) U.S. Cl.
CPC .............. *G06F 9/5072* (2013.01); *H04L 43/08* (2013.01)

(58) Field of Classification Search
CPC ... H04L 67/18; H04L 67/125; H04L 67/1025; H04L 67/02; H04L 45/08; H04L 45/16; H04L 45/56; H04L 45/586; H04L 43/08; H04L 43/04
See application file for complete search history.

(56) References Cited

U.S. PATENT DOCUMENTS

| 2010/0058352 | A1* | 3/2010 | Esfahany et al. ............ 718/105 |
| 2010/0153482 | A1 | 6/2010 | Kim et al. |
| 2010/0169477 | A1 | 7/2010 | Stienhans et al. |
| 2010/0223383 | A1 | 9/2010 | Salevan et al. |
| 2010/0319004 | A1* | 12/2010 | Hudson ................ G06F 9/5072 719/313 |
| 2011/0055399 | A1 | 3/2011 | Tung et al. |
| 2011/0145392 | A1 | 6/2011 | Dawson et al. |
| 2011/0179162 | A1 | 7/2011 | Mayo et al. |
| 2011/0179233 | A1 | 7/2011 | Golbourn |
| 2011/0265164 | A1* | 10/2011 | Lucovsky ........... G06F 9/45533 726/7 |
| 2012/0102494 | A1* | 4/2012 | Cahill .................. G06F 9/5072 718/102 |
| 2013/0060933 | A1* | 3/2013 | Tung .................. G06F 11/3495 709/224 |
| 2013/0073667 | A1* | 3/2013 | Mukkara ............... G06F 9/5061 709/213 |

FOREIGN PATENT DOCUMENTS

WO 2010058215 A1 5/2010

OTHER PUBLICATIONS

C. Vazquez et al, "On the Use of Clouds for Grid Resource Provisioning", Future Generation Computer Systems, vol. 27, Issue No. 5, May 2011, pp. 1-8.

* cited by examiner

*Primary Examiner* — Dhairya A Patel
(74) *Attorney, Agent, or Firm* — Law Office of Jim Boice (57) ABSTRACT

According to one embodiment of the present invention, a method computing resources are dynamically provisioned to meet service level objectives in a cloud computing environment. Resources available for provisioning to the cloud computing environment are determined and the quality thereof monitored. Current resource needs for a cloud job tenancy are determined, and selected resources are dynamically provisioned from resources available for provisioning based on the current resource needs and the quality of the resources available in order to meet the cloud job tenancy and the service level objectives.

2 Claims, 8 Drawing Sheets

-<ResourceHealthGrade>
 <ResourceType/> ⤳ 402
 -<ResourceId> ⤳ 404
 -<ResourceHealthGrading> ⤳ 406
  +<AbsoluteWeightedScore> ⤳ 408
  +<RelativeWeightedScore> ⤳ 410
 </ResourceHealthGrading>
 <ResourceId>
</ResourceHealthGrade>

412 ⤳

-<ResourceHealthGrade>
 <ResourceType/>
 -<ResourceId>
 -<ResourceHealthGrading>
  -<AbsoluteWeightedScore> ⤳ 408
   -<HealthParameter_1> ⤳ 413
    <CurrentValue/> ⤳ 416
    <IsCritical/> ⤳ 418
    <LowerThreshold/> ⤳ 420
    <UpperThreshold/> ⤳ 422
    <ToleranceLimit/>
   </HealthParameter_1>
   +<HealthParameter_N> ⤳ 414
  </AbsoluteWeightedScore>
  +<RelativeWeightedScore>
 </ResourceHealthGrading>
 </ResourceId>
</ResourceHealthGrade>

424 ⤳

-<ResourceHealthGrade>
 <ResourceType/>
 -<ResourceId>
 -<ResourceHealthGrading>
  +<AbsoluteWeightedScore>
  -<RelativeWeightedScore> ⤳ 410
   -<ScoreDetails>
    <IsCritical/>
    <SegmentedParameterList/>
    <SegmentedParameterValue/>
   </ScoreDetails>
  </RelativeWeightedScore>
 </ResourceHealthGrading>
 </ResourceId>
</ResourceHealthGrade>

FIG. 4

```
500                                   502                                      504
 ~                                     ~                                        ~
-<CatalogedTenancyModel>              -<ProvisioningHealthModel>               -<CandidateProvisioningModel>
  <CatalogedTenancyModelId/> ~506      <CataloguedTenancyModel_Id/> ~518        <RequirementTenancyModel_Id/> ~524
  <RequirementTenancyModel_Id/> ~508   <TenancySatisfyingIndex> ~520           -<CandidateResources> ~526
 -<ProvisionedResources> ~510         -<ResourceId_1> ~522                     -<ResourceId_1> ~528
  -<ResourceId_1> ~512                  <ResourceType/>                          <ResourceType/>
    <ResourceType/> ~514               -<AbsoluteWeightedScore>                -<ResourceHealthGrading>
   -<AbsoluteWeightedScore> ~516        -<HealthParameter_1>                    -<AbsoluteWeightedScore>
    +<HealthParameter_1>                  <CurrentValue/>                        +<HealthParameter_1>
    +<HealthParameter_N>                  <IsCritical/>                          +<HealthParameter_N>
   </AbsoluteWeightedScore>              <LowerThreshold/>                     </AbsoluteWeightedScore>
  </ResourceId_1>                        <UpperThreshold/>                    -<RelativeWeightedScore>
  +<ResourceId_2>                        <ToleranceLimit/>                      +<ScoreDetails>
  +<ResourceId_N>                       </HealthParameter_1>                   </RelativeWeightedScore>
 </ProvisionedResources>                +<HealthParameter_N>                  </ResourceHealthGrading>
</CatalogedTenancyModel>               </AbsoluteWeightedScore>                </ResourceId_1>
                                      </ResourceId_1>                         +<ResourceId_2>
                                       +<ResourceId_2>                         +<ResourceId_N>
                                       +<ResourceId_N>                        </CandidateResources>
                                      </ProvisioningHealthModel>             </CandidateProvisioningModel>
```

600
-<TenancyRequirement>
 +<Functional>
 +<NonFunctional>
 +<Constraints>
</TenancyRequirement>

602
-<TenancyRequirement>
 -<Functional>
   <HostingConstraints/> ~608
   <TenancyDomain/> ~610
   <TenancyLayers/> ~612
   -<TenancyServiceModel> ~620
     <ConfigurationSettings/> ~622
     <SecurityLevels/> ~624
   </TenancyServiceModel>
   <TenancyPriority/> ~614
   <WorkFlow/> ~618
 </Functional>

604
-<TenancyRequirement>
 +<Functional>
 -<NonFunctional>
   <ProcessorUtilization/> ~626
   <PersistentStorageRequired/> ~628
   <ResponseTime/> ~630
   <AvailabilityFactor/> ~632
   <ScalabilityNodes/> ~634
   <RedundancyNodes/> ~636
 </NonFunctional>

606
-<TenancyRequirement>
 +<Functional>
 +<NonFunctional>
 -<Constraints>
   <TenancyClass/>
   -<DomainConstraints> ~638
     <CacheRequests/> ~642
     <TransactionRetentionPeriod/> ~644
     <AccessControl/> ~646
   </DomainConstraints>
   -<OperationalConstraints> ~640
     <PeakLoad/> ~648
     <OptimalLoad/> ~650
     <PeakDurationOfDay/> ~652
     <IsolationLevels/> ~654
   </OperationalConstraints>
 </Constraints>
</TenancyRequirement>

```
-<ProvisionedResourcePool>
  <ProvisionID/> ~704
  <RequirementTenancyModel_Id/> ~706
  -<ProvisionedResources>
    -<ResourceId_1> ~707
      <ResourceType/>
      -<ResourceHealthGrading> ~710
        -<AbsoluteWeightedScore>
          -<HealthParameter_1>
            <CurrentValue/>
            <IsCritical/>
            <LowerThreshold/>
            <UpperThreshold/>
            <ToleranceLimit/>
          </HealthParameter_1>
          +<HealthParameter_N>
        </AbsoluteWeightedScore>
        -<RelativeWeightedScore> ~712
          +<ScoreDetails>
            <IsCritical/>
            <SegmentedParameterList/>
            <SegmentedParameterValue/>
          </ScoreDeatils>
        </RelativeWeightedScore>
      </ResourceHealthGrading>
    </ResourceId_1>
    +<ResourceId_2> ~708
    +<ResourceId_N> ~709
  </ProvisionedResources>
</ProvisionedResourcePool>
```

```
-<ProvisionedResourcePool>
  <ProvisionID /> ~704
  <RequirementTenancyModel_Id/> ~706
  -<ProvisionedResources>
    -<ResourceId_1> ~707
      <ResourceType/>
      -<ResourceHealthGrading>
        -<AbsoluteWeightedScore> ~710
          +<HealthParameter_1>
          +<HealthParameter_N>
        </AbsoluteWeightedScore>
        -<RelativeWeightedScore> ~712
          +<ScoreDetails>
        </RelativeWeightedScore>
      </ResourceHealthGrading>
    </ResourceId_1>
    +<ResourceId_2> ~708
    +<ResourceId_N> ~709
  </ProvisionedResources>
</ProvisionedResourcePool>
```

FIG. 7

PREDICTIVE AND DYNAMIC RESOURCE PROVISIONING WITH TENANCY MATCHING OF HEALTH METRICS IN CLOUD SYSTEMS The present application is a continuation of U.S. patent application Ser. No. 13/306,283, filed on Nov. 29, 2011, and entitled, "Predictive and Dynamic Resource Provisioning with Tenancy Matching of Health Metrics in Cloud Systems," which is incorporated herein by reference.

BACKGROUND

The present invention relates to a cloud computing environment, and, in particular, to provisioning of infrastructure resources.

A recent model, known as cloud computing, enables convenient, on-demand network access to a shared pool of configurable computing resources (e.g., networks, servers, storage, applications, and services) that can be rapidly provisioned and released with minimal management effort or service provider interaction. "Rapid elasticity," an essential characteristic of the cloud model, refers to rapidly and elastically provisioning computing capabilities to quickly scale out, and quickly scale in by rapidly releasing the computing capabilities. The provisioning of computing resources for different application services and models under transient conditions, on the cloud infrastructure inclusive of hardware, software and services is a challenging problem to tackle. This is because clouds exhibit varying demands, supply patterns, system sizes, and resources (hardware, software, network). Users have heterogeneous, dynamic, and competing Quality of Service (QoS) requirements, and applications have varying performance, workload, and dynamic application scaling requirements.

BRIEF SUMMARY

According to one embodiment of the present invention, a method dynamically provisions computing resources to meet service level objectives in a cloud computing environment. A processor determines and monitors quality of resources available for provisioning to the cloud computing environment. The processor determines current resource needs for a cloud job tenancy, and dynamically provisions selected resources from resources available for provisioning based on the current resource needs and the quality of the resources available in order to meet the cloud job tenancy and the service level objectives.

BRIEF DESCRIPTION OF THE SEVERAL VIEWS OF THE DRAWINGS

FIG. 7 illustrates XML representations of Provisioned Resource Pools.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
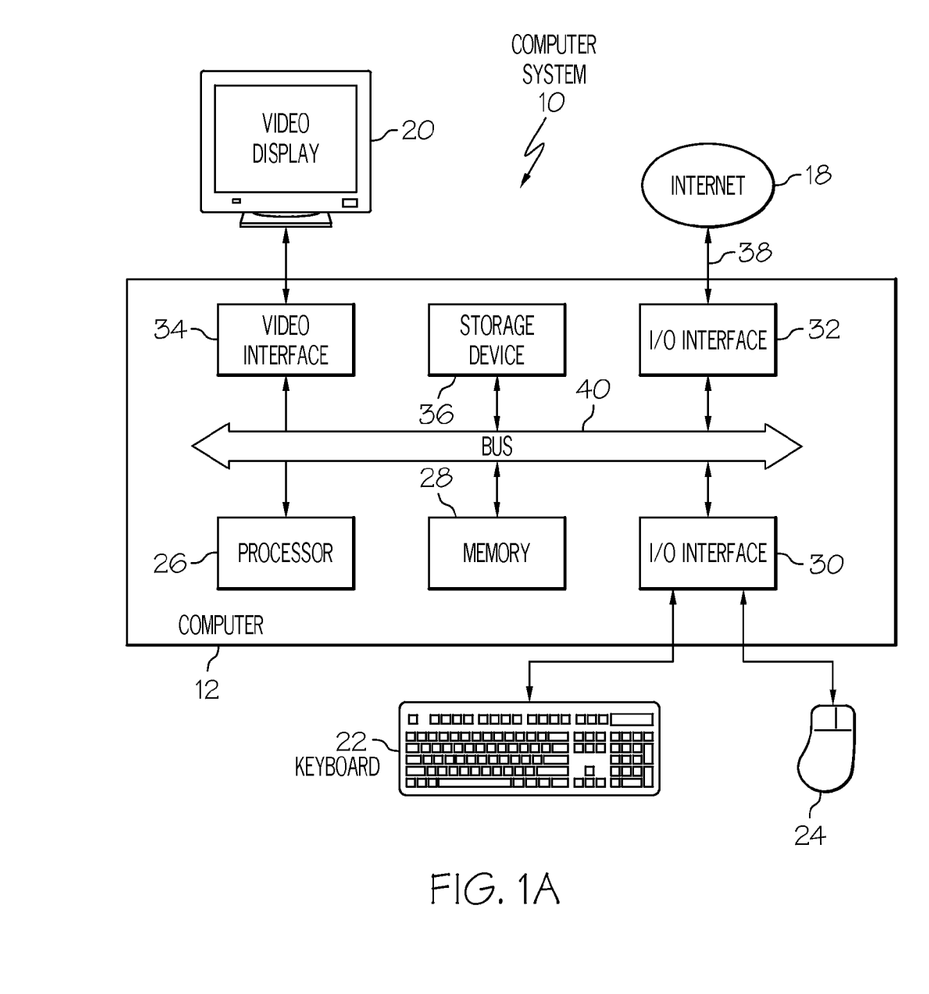
FIG. 1A is an illustration of computer hardware upon which an embodiment of the present invention may operate.

FIG. 1A is one example of a computer system 10 suitable for executing computer software for predictive and dynamic resource provisioning with tenancy matching of health metrics in cloud systems. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 1B:
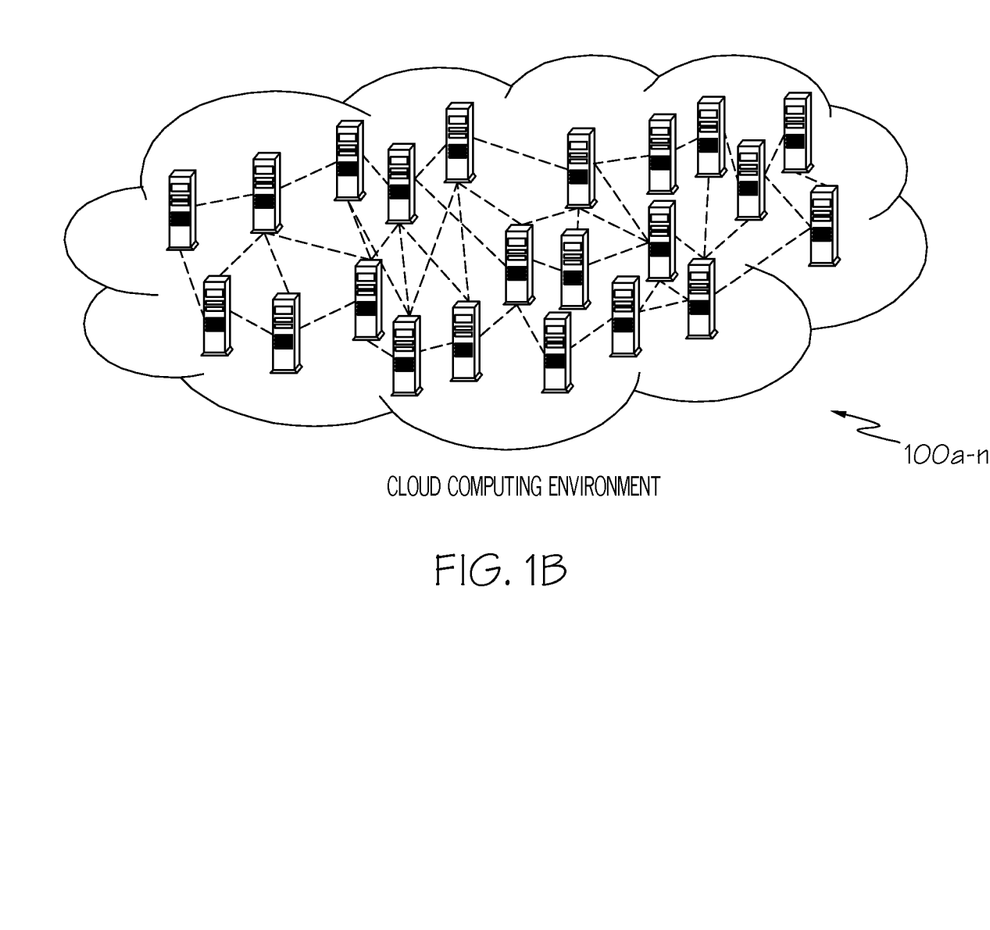
FIG. 1B is an illustration of a typical cloud computing hardware environment.

Referring to FIG. 1B, a Cloud environment is shown comprising multiple computer systems 100a-100n, which are interconnected. Cloud computing involves multi-tenancy which is the ability to run multiple customers on a single software instance installed on multiple servers to increase resource utilization by allowing load balancing among tenants, and to reduce operational complexity and cost in managing the software to deliver the service. Multi-tenancy is not a multi-instance architecture where separate software instances (or hardware systems) are set up for different client organizations.

There are three aspects of multi-tenancy strategies:
1) Physical Separation;
2) Virtualization; and
3) Automatic adjustment of behavior for different tenants at runtime.

Physical separation relies on giving each tenant his own dedicated hardware resources. Virtualization uses software to create application hosting environments that provide logical boundaries between each tenant. The application must be designed to be multi-tenant aware, and, therefore, the third strategy is to design different aspects of the application to automatically adjust its behavior differently for different tenants at runtime.

A cloud provider's computing resources are pooled to serve multiple consumers using the multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Multi-tenancy, however, creates a number of concerns for users, such as:
1) Security and inappropriate data access;
2) Impact of other clients on their system performance;
3) Being forced into an upgrade;
4) Inability to support the level of client specific configurations and even customizations as necessary;
5) Inability to obtain client level user acceptance testing;
6) Inability to determine the precise production/go live dates for the system; and
7) If the number of users in a tenant are large, e.g. >1000 users, then the multi-tenant advantages start losing value, as they may need separate hosting with separate maintenance.

Dynamic resource provisioning approaches help determine the number/type of resources required to meet service level objectives (SLOs). These approaches typically involve:
1) Constructing an application performance model that predicts the number/type of application instances required to handle demand at each particular level, in order to satisfy Quality of Service (QoS) requirements;
2) Periodically predicting future demand and determining resource requirements using the performance model; and
3) Automatically allocating resources using the predicted resource requirements.

However, the quality of chosen resource(s) is assumed to remain constant throughout the time period of provisioning. Also the status of an entire system reflects the status of the component on the system that has the most severe status. For example, if a component within a system has a status of critical, the entire system will have a status of critical, even if the critically impacted component is not critical to the current tenancy requirements within the provisioned system. Thus, the assumption that the quality of chosen resources remains constant throughout the time period of provisioning involves limitations:
1) Does not take into account, the effect of the health of the provisioned resources, which would diminish due to continuous execution of processes:
   A. The system eventually slows down due to operating system related issues such as:
      1. Fragmentation, bigger registries, additional process loads, and
      2. Effect of thrashing (i.e., when two or more processes access a shared resource repeatedly such that serious system performance degradation occurs because the system is spending a disproportionate amount of time just accessing the shared resource);
   B. Effect of varying available memory (RAM, Virtual, Persistent Storage) for processing either due to increase in the number of tenants or burst of load, or due to the application performance and memory consumption over time; and
   C. Dynamically changing virtual memory requirements based on addition of another Tenant.
2) Does not take into account the effects of multi-tenancy dynamics, as that can affect the agreed upon SLO's for already provisioned tenants:
   A. Adding another tenant (similar to increasing number of requests for a service);
   B. Non-availability of any service on the provisioned resource due to maintenance and/or upgrades;
   C. Increased burst of load on a specific multi-tenant application; and
   D. Dynamically changing tenancy requirements such as time bound ramp-up or ramp-down in throughput requirements, e.g. increase during peak hours (typically seasonal as in case of a retail web-site) and decrease during off peak/night hours.

Figure 2:
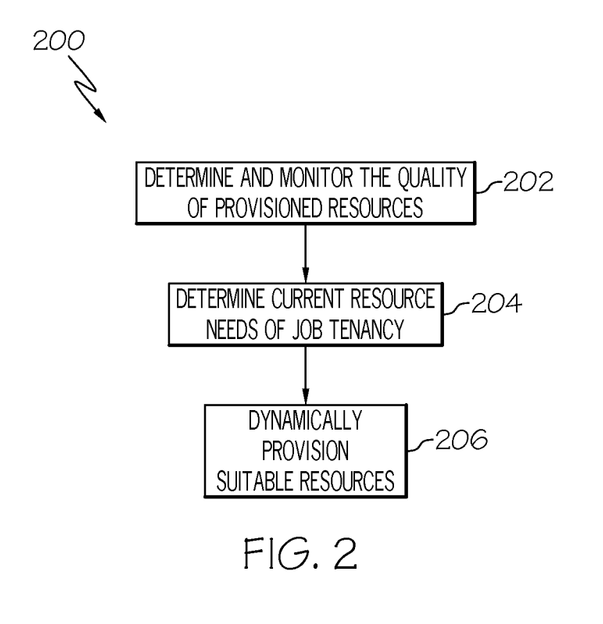
FIG. 2 is a high level flowchart of one embodiment of the present invention.

Referring now to FIG. 2, a high level flowchart 200 illustrates one embodiment of the present invention. At block 202, the process begins by determining and monitoring the quality of resources provisioned for the cloud. At block 204, the current resource needs are determined for a cloud job tenancy, and resources suitable for the job tenancy are then dynamically provided to the cloud at block 206.

Figure 3:
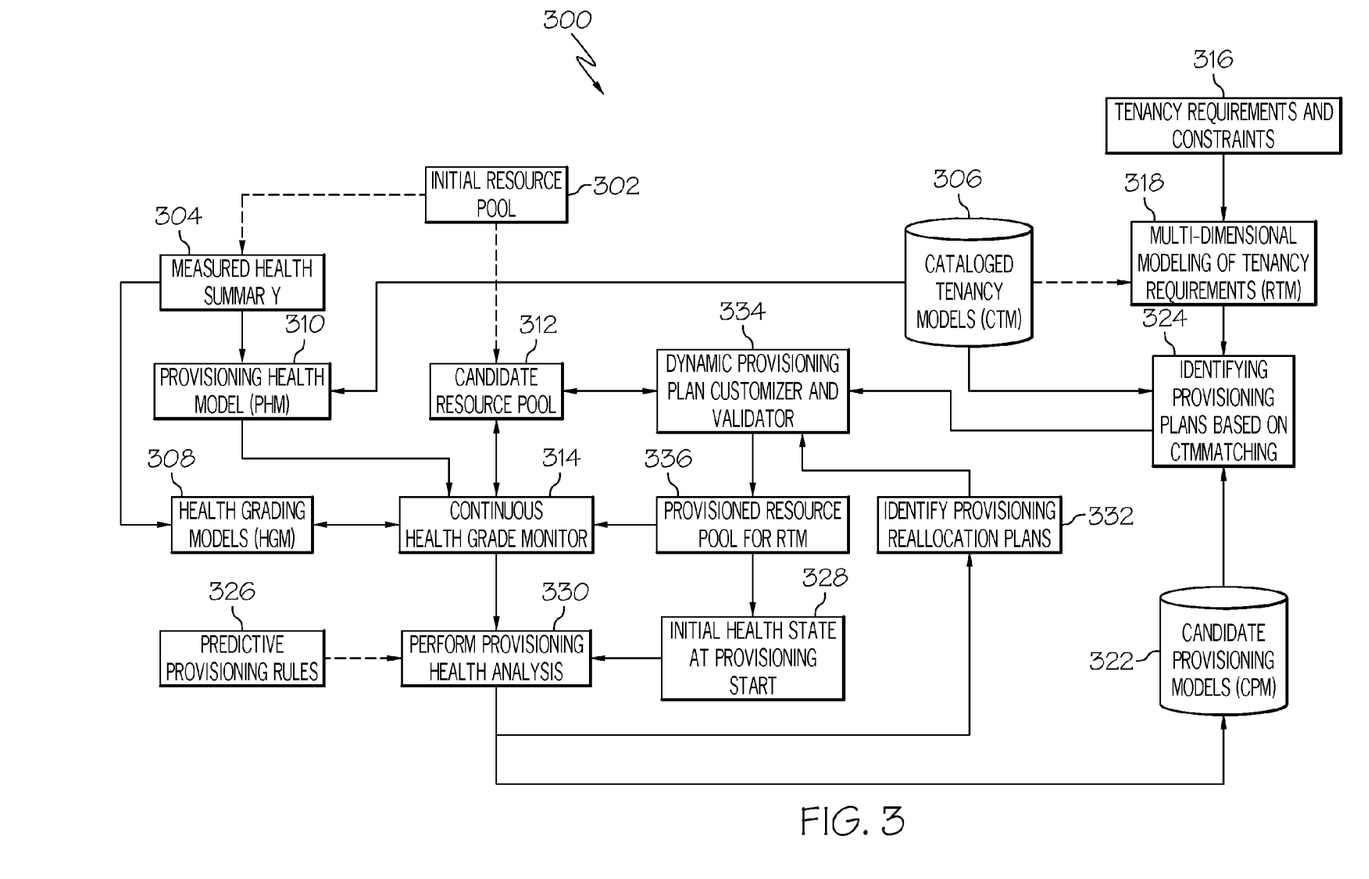
FIG. 3 is an illustration of the components of a health and tenancy requirement based dynamic predictive provisioning system in accordance with one embodiment of the present invention.

Referring now to FIG. 3, the components of a health and tenancy requirement based dynamic predictive provisioning system 300 in accordance with one embodiment of the invention is illustrated. The first step (block 202 of FIG. 2) is to determine and monitor the quality of provisioned resources. The components for this step include:
1) An Initial Resource pool 302—the entire set of resources available for usage;
2) A Measured Health Summary 304—resource type based parameterized health summary for each individual resource. For example, in a typical computer system, the parameterized health summary would comprise the number of available CPU cores, available RAM for application and infrastructure runtime components (physical and virtual), Network bandwidth, available disk storage, and etc. The measured health for all of the above parameters varies dynamically.
3) Cataloged Tenancy Models (CTM) 306—repository of past experiences specifying resources provisioned corresponding to requirement tenancy models;
4) Health Grading Models (HGM) 308—a set of resources of the same resource type classified based on their absolute and relative graded health;
5) Provisioning Health Model (PHM) 310—a set of resources involving different resource types, classified based on their possible usage in satisfying a requirement tenancy;
6) Candidate Resource pool 312—a set of identified eligible healthy resources involving different resource types that qualify for provisioning in specific tenancy. This pool also comprises identified replacement resources; and 7) Continuous Health grade monitor 314—has multiple responsibilities of:
   a) releasing/acquiring resources in a Candidate Resource Pool 312;
   b) examining the Provisioned Resource Pool 336 to monitor and update their current health grade model; and
   c) providing inputs for Performing Provisioning Health Analysis 330.

Figure 4:
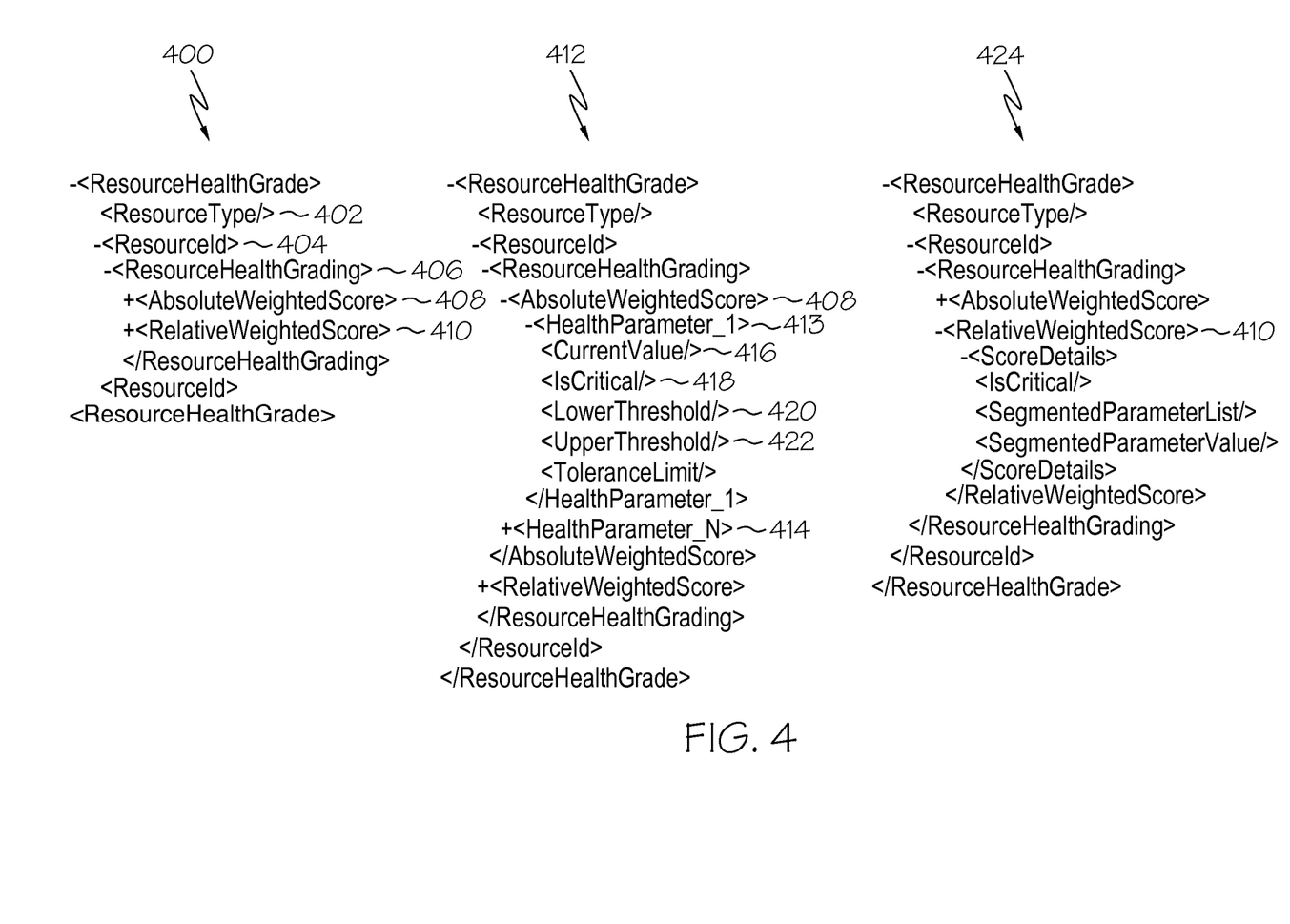
FIG. 4 illustrates an XML representation of Health Grading Model component.

Referring to FIG. 4, the HGM component 308 (FIG. 3) is further illustrated. Each available resource is graded based on its current state. Continuous grade monitoring allows for re-hashing the grade parameters. FIG. 4 illustrates an XML representation of a Health Grading Model 308. Each column represents the same model at different levels of detail. The first column, generally identified by reference numeral 400, provides the highest level of elements comprising the Health Grading model. These elements are resource type 402, resource id 404, and resource health grading 406. The resource health grading 406 is further comprised of elements AbsoluteWeightedScore 408 and RelativeWeightedScore 410.

The second column, generally identified by reference numeral 412, depicts the details of the AbsoluteWeightedScore 408 element from the first column 400. For each resource, there can be one or many health parameters which are depicted by HealthParameter_1 413-HealthParameter_N 414. Each of these parameters has values corresponding to the keys of CurrentValue 416, IsCritical 418, LowerThreshold 420 and UpperThreshold 422 values.

Similarly, the third column, generally identified by reference numeral 424, further details the RelativeWeightedScore 410 from the first column 400. The RelativeWeightedScore 410 is an XML representation, wherein the health of the resource is graded based on relative comparison of similar type of available resources. Each of the segmented scores within RelativeWeightedScore can have an absolute value of 0-100, 100 being the maximum available within the set of available resources, 0 being the minimum available within the set of available resources. For example, the <SegmentedParameterList> element within the RelativeWeightedScore 410 could have a representation like: CPU|Memory|Storage|N/W|Downtime and the corresponding <SegmentedParameterValue> element representation can be 80|94|100|72|95. The interpretation and representation of each of these segmented parameter list(s), their values and the value range would be resource specific and extended further based on the actual embodiment. It is to be understood that the list of elements shown in FIG. 4 is for the purpose of illustration only, and can be easily extended to accommodate various other element types that might be required based on the specific application of the present invention.

Returning to FIG. 3, the second step (block 204 of FIG. 2) is to determine current resource needs of the job tenancy. The components for this step include:

1) Tenancy Requirements and Constraints 316—Specified requirements and constraints for tenancy;
2) Multi-dimensional Modeling of Tenancy Requirements (RTM) 318—Classified requirements based on functional, non-functional and constraints;
3) Candidate Provisioning Models (CPM) 322—Repository of currently available resources for provisioning identified based on health and predictive analysis;
4) Identifying Provisioning Plans based on CTM Matching 324—Has multiple responsibilities of:
   a) Match1: Identify closest (active/inactive) existing provisioning from CTM 306 that matches current RTM 318;
   b) Match 2: Identify the closest CPM 322, satisfying the CTM 306 of Match1; and
   c) Match 3: If no match is found from CTM 306, identify closest required CPM 322 satisfying the RTM 318.

Figure 5:
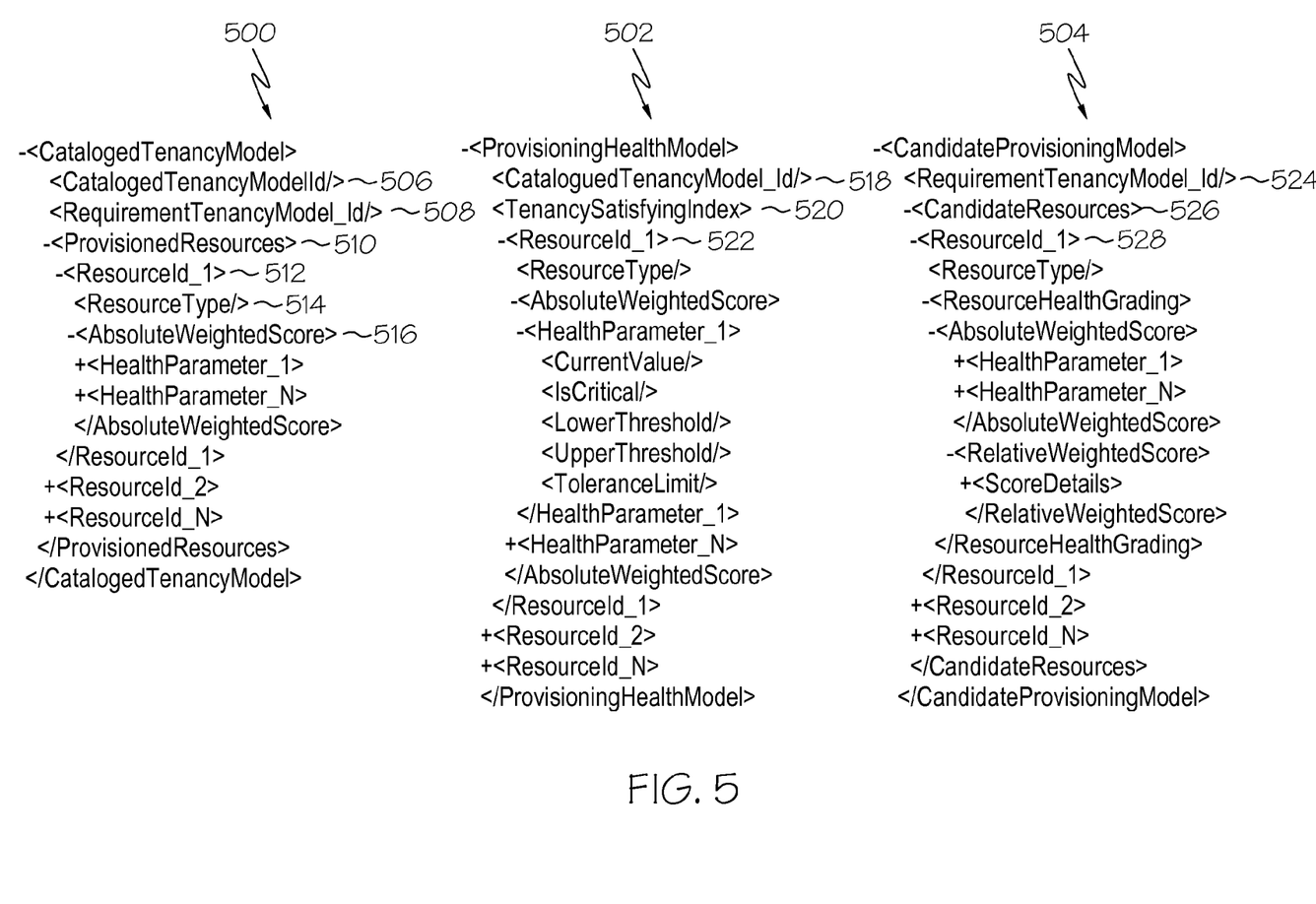
FIG. 5 illustrates an XML representation of a Cataloged Tenancy Mode, a Provisioning Health Model, and a Candidate Provisioning Model.

Referring to FIG. 5, an XML representation of a CTM (306 in FIG. 3) is generally indicated by reference numeral 500, a PHM (310 in FIG. 3) is generally indicated by reference numeral 502, and a CPM (322 in FIG. 3) is generally indicated by reference numeral 504.

The CatalogedTenancyModel (CTM 306 in FIG. 3), generally identified by reference numeral 500, is comprised of the elements of: CatalogedTenancyModelId 506, a reference to the Multi-Dimensional Modeling of Tenancy Requirements (RTM 318) by way of the value of RequirementTenancyModel_id 508, and details on one or more Provisioned Resources 510. Each of the provisioned resources (such as ResourceId_1 512) is, in turn, comprised of the elements of ResourceType 514 and AbsoluteWeightedScore 516.

The ProvisioningHealthModel (PHM 310 in FIG. 3), generally identified by reference numeral 502, comprises the elements of: a reference to the CTM (306 in FIG. 3), by way of element CatalogedTenancyModel_Id 518, the TenancySatisfyingIndex 520 value and one or more resources that constitute a specific instance of CTM (306 in FIG. 3).

The CandidateProvisioningModel (CPM 322 in FIG. 3), generally identified by reference numeral 504, is comprised of the elements of: a reference to the RTM (318 in FIG. 3) by way of element RequirementTenancyModel_Id 524, and the identified CandidateResources 526 by way of one or more resources, such as ResourceID_1 528, that can satisfy a specific instance of RTM (318 in FIG. 3). It is to be understood that the list of elements shown in FIG. 5 is for the purpose of illustration only, and can be easily extended to accommodate various other element types that might be required based on the specific application of the present invention.

Figure 6:
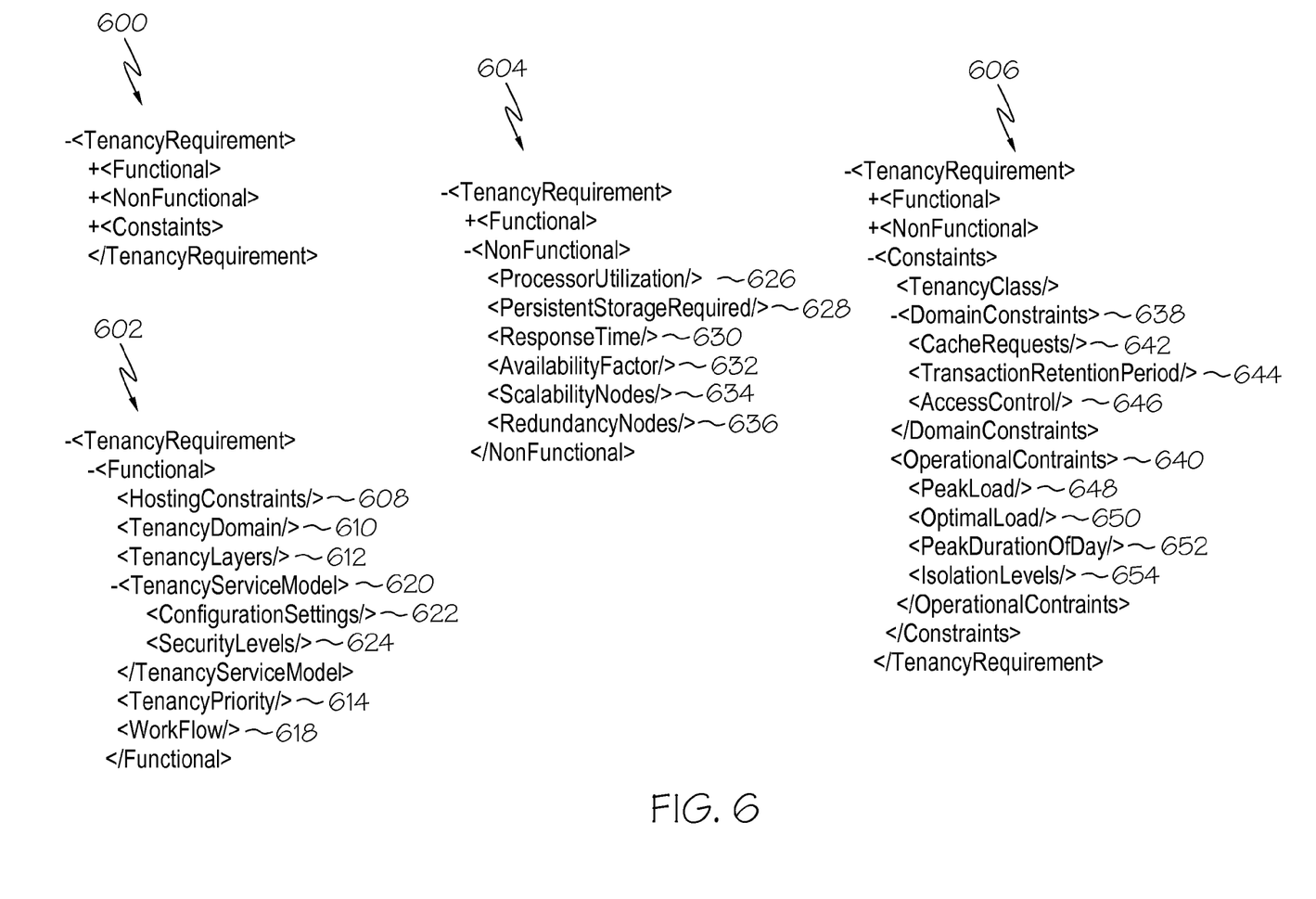
FIG. 6 illustrates an XML representation of a Requirement Tenancy Model.

Referring to FIG. 6, an XML representation of a Requirement Tenancy Model, generally identified by reference numeral 600 (RTM 318 in FIG. 3), is illustrated. Each column depicted in FIG. 6 represents the same Requirement Tenancy Model 600 but at different levels of detail. Typical Functional requirements, generally identified by reference numeral 602, for a Requirement Tenancy Model, may comprise data parameters of HostingConstraints 608, TenancyDomain 610, TenancyLayers 612, TenancyPriority 614, Workflow 618, and the TenancyServiceModels 620, which in turn may comprise ConfigurationSettings 622 and SecuityLevels 624.

Typical Non-Functional requirements, generally identified by reference numeral 604, for a Requirement Tenancy Model, may comprise data parameters of ProcessorUtilization 626, size of PersistentStorageRequired 628, ResponseTime 630, AvailabilityFactor 632, number of ScalabilityNodes 634, and number of RedundancyNodes 636.

Typical Constraints, generally identified by reference numeral 606, for a Requirement Tenancy Model, could comprise DomainConstraints 638 and OperationalConstraints 640. The DomainConstraints 638, in turn, can capture data values for CacheRequests 642, TransactionRetentionPeriod 644, AccessControl 646. The OperationalConstraints 640 can capture data values for PeakLoad 648, OptimalLoad 650, PeakDurationOfDay 652, and IsolationLevels 654. It is to be understood that the list of elements shown in FIG. 6 is for the purpose of illustration only, and can be easily extended to accommodate various other element types that might be required based on the specific application of the present invention.

Returning to FIG. 3, the third step (block 206 of FIG. 2) is to dynamically provision suitable resources. The components used for this step include:
1) Predictive Provisioning Rules 326—Set of rules used for predictive analysis, based on past experience;
2) Initial Health State at Provisioning Start 328—Represents initial health state of the Provisioned Resource Pool for RTM 336;
3) Perform Provisioning Health Analysis 330—Has multiple responsibilities of:
   a. Classifying currently provisioned resources based on updated health grades; and
   b. Applying Predictive Provisioning Rules 326, to identify potentially/already unhealthy resources;
4) Identify Provisioning Reallocation Plans 332—Has responsibility to identify plans on reallocation of current unhealthy resources based on health analysis;
5) Dynamic Provisioning Plan Customizer and Validator 334—Has multiple responsibilities of:
   a. Identifying provisioned resources from candidate pool, based on required provisioning for RTM and reallocation plans; and
   b. Validating the provisioned resources plan, at end of cycle, based on fulfillment of tenancy requirements; and
6) Provisioned Resource Pool for RTM 336—Set of healthy resources provisioned to satisfy tenancy requirements and constraints.

Referring to FIG. 7, examples of Provisioned Resource Pools, generally identified by reference numerals 700 and 702, are shown as XML representations. Each column 700 and 702 represents the same model, however, at different levels of detail. This model depicts the final set of provisioned resources that satisfy the needs of a given Requirement Tenancy Model (RTM 318 in FIG. 3). Each ProvisionedResourcePool model 700 and 702 typically has the elements of ProvisionId 704, a reference to the RTM, by way of the value of RequirementTenancyModel_id 706, and details on one or more resources, such as ResorceId_1 707, ResorceId_2 708, and ResorceId_N 709 comprising the provisionings. These resources can be of various types and each resource in turn is comprised of the elements AbsoluteWeightedScore 710 and RelativeWeightedScore 712. It is to be understood that the list of elements shown in FIG. 7 is for the purpose of illustration only, and can be easily extended to accommodate various other element types that might be required based on the specific application of the present invention.

One embodiment of the present invention will now be discussed with reference to FIG. 3 and the three steps, previously described above, i.e.:
  Step 1: Determine and monitor the quality of provisioned resources;
  Step 2: Determine current resource needs of job tenancy; and
  Step 3: Dynamically provision suitable resources.

Step One: Determine and monitor the quality of provisioned resources:
1. Initially, the resources in the Candidate Resource Pool 312 (FIG. 3) are similar to those of the resources in the Initial Resource Pool 302. The initial resource pool is the set of all available resources for provisioning. It is assumed that a set of resources are already available for provisioning, as this is the starting state of a cloud system with given resources. The Candidate Resource Pool is a set of resources that qualify for current tenancy requirement (wherein the past tenancy experience is already accounted for).
2. Determine the measured health summary of resources available in the initial resource pool using resource type based parameterized health summary for each individual resource. For example, as previously stated above, in a typical computer system, the parameterized health summary would comprise the number of available CPU cores, available RAM for application and infrastructure runtime components (physical and virtual), Network bandwidth, available disk storage, and etc. The measured health for all of the parameters varies dynamically.
3. Determine the provisioning health model (PHM 310) based on resource types used for the specific tenancy requirements as captured in the Cataloged Tenancy Model (CTM 306).
4. Determine the health grading model (HGM 308) to have either a relative or absolute grading of the resources to determine the resource equivalence.
5. Update the HGM 308 and PHM 310 using the health grade monitor 314 to reclassify the Candidate Resource Pool (CRP 312) by filtering out any mismatched resources.

Step 2: Determine current resource needs of job tenancy:
1. Identify the closest existing tenant provisioned (either active or inactive) from the Cataloged Tenancy Model (CTM 306) pool, based on the RTM 318 match (Match1).
2. Identify the corresponding provision model from the result of Match 1 and identify the closest Candidate Provision Model (CPM 322), i.e., Match 2. The identified Candidate Provision Model is fed into the Dynamic Provisioning Plan Customizer and Validator 334.
3. If Match1 fails or if Match2 fails, identify the closest required provision model from CPM 322.

Step 3: Dynamically Provision Suitable Resources:
1. Initially, the Provisioned Resource Pool for RTM 336 would be similar to that of the Candidate Resource Pool 312.
2. Feed the Initial Health State at Provisioning Start 328 into the Perform Provisioning Health Analysis 330. This determines if the currently allocated resources need any re-allocation. Also, the data set is used to update Candidate Provisioning Models 322 based on the analysis and input from the Health Grade Monitor 314 (as in case of a newly added resource that might be more healthy/suitable).
3. During the reallocation, if any, a new provisioning plan as derived from the Candidate Provisioning Models 322, and is validated by the Dynamic Provisioning Plan Customizer and Validator 334. The new resources are allocated from the Candidate Resource Pool 312 based on the newly adjusted provisioning plan.

The predictive provisioning rules in accordance with one embodiment of the present invention comprise pre-defined rules defining the threshold levels of resource parameters based on past experience. Threshold levels are either Lower Limit or Upper Limit. Provisioning health analysis employs a prediction algorithm in terms of estimating the health parameter values on a given time frame based on past data. For example, one embodiment uses an Auto-Regressive (AR) Model for Prediction. Each of the individual resource health parameters are tracked over a period of defined time, so as to predict the possible next value. Let $\{x(k)\}$ be the time series of a health attribute x, where x(k) represents the measured value of x during time interval k. At the beginning of every interval k, a standard auto-regressive model predicts an attribute's value for the current interval using a linear combination of its measured value in the past several intervals, using the following algorithm:

$$\hat{x}(k) = \sum_{i=1}^{m} a_i x(k-i)$$

where x^(k) is the predicted value for x(k), $a_i$'s are the predictor coefficients, and m is the order of the model that indicates the number of past samples used for the prediction.

When the predicted value for x(k), falls out of the defined threshold levels by the predictive provisioning rules, the parameter is marked as critical. During the Identify Provisioning Reallocation Plans 332, the parameters of a resource are examined for critical flags and alternate provisioning plans are suggested. The Dynamic Provisioning Plan Customizer and Validator 334 examines the alternate provisioning plans and validates in relevance to the tenancy requirement and selects the appropriate plan for re-provisioning the tenancy.

One embodiment of the present invention is illustrated, as follows with reference to FIG. 3:
1. The algorithm is used to predict the value of a particular parameter (x), with inputs for the range of historical data.
2. Varying groups of parameters are determined based upon specific health aspects of a given tenancy domain. For this group of parameters, the criticality of the resource is decided based upon the predicted values defined in the component Predictive Provisioning Rules 326.
3. For each of the resources participating in the current tenancy requirement provisioning, the resource is classified as a healthy/unhealthy resource, based on criticality of specific resource parameter(s). This is performed as part of the component Provisioning Health Analysis 330.
4. The dynamic provisioning plan, as well as any re-provisioning plan with a replacement resource, would be arrived at based on this output of the resource classification as healthy/unhealthy from step 3 above. This is done by the component Identify Provisioning Reallocation Plans 332.
5. The actual provisioning/reallocation would be carried out based on the plan determined in step 4 and performed by the component Dynamic Provisioning Plan Customizer and Validator 334.

The present invention provides at least the following advantages over the prior art:
1. enables the capture and representation of tenancy requirements in a formalized model, both for future reuse considerations and for continuous conformance of provisioning;
2. acts as an intermediary to certify and guarantee accurate provisioning of cloud resources based upon tenancy requirement models and resource health models;
3. flexibly switches between health monitoring for provisioned resources and health monitoring for candidate resource pools in order to support published catalogue based tenancy provisioning as well as made-to-order tenancy provisioning.
4. continuously monitors and replaces provisioned systems based upon changing health grades. A best-fit resource is provided for the current tenancy requirement and, thus, resource utilization is maximized and the cost of hosting is reduced.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of dynamically provisioning computing resources to meet changing service level objectives in a cloud computing environment, comprising:
with a processor, determining and monitoring quality of resources available for provisioning to the cloud computing environment in order to expand or contract the cloud computing environment, as required, said determining and monitoring further comprising:
determining a measured health summary of resources available in an initial resource pool using a resource type based parameterized health summary for each individual resource, said parameterized health summary for each individual resource comprising at least number of available central processing unit cores, available random access memory, infrastructure runtime components, network bandwidth, and available disk storage, wherein said measured health for said parameterized health summary for each individual resource varies dynamically to account for resource interaction limitations and change in workload;
determining a provisioning health model based on resource types previously used for similar cloud job tenancy requirements as captured in a cataloged tenancy model, said provisioning health model comprising different resource types, classified based on their possible usage in satisfying a requirement tenancy;
determining a health grading model for each individual resource of a same type to have relative and absolute grade parameters available to determine resource equivalence, wherein said relative grade parameter comprises a score determined to be between a minimum and a maximum range for each individual resource of a same type and said absolute grade parameters comprise scores corresponding to a current value, a critical value, a lower threshold value, and an upper threshold value; and
updating the health grading model and provisioning health model using a health grade monitor to reclassify any said each individual resource in said initial resource pool by filtering out any mismatched resources as determined by said relative and said absolute grade parameters of said health grading model and said resource types used for similar cloud job tenancy requirements as captured in a cataloged tenancy model;

determining, with said processor, current resource needs for a cloud job tenancy; and dynamically provisioning selected resources from said resources available for provisioning the cloud based on said current resource needs and said quality of said resources available in order to meet said cloud job tenancy and the service level objectives.

2. The method of claim 1, wherein said determining current resource needs for a cloud job tenancy comprises:

identifying a closest existing tenant provisioned from a pool of tenants in said cataloged tenancy model, said tenancy model comprising resource types previously used for similar cloud job tenancy requirements, based on a modeling of tenancy requirements, as a first match, said tenancy requirements comprising:

functional requirements comprising data parameters of HostingConstraints, TenancyDomain, TenancyLayers, TenancyPriority, Workflow, and the TenancyServiceMode;

non-functional requirements comprising data parameters of ProcessorUtilization, size of PersistentStorageRequired, ResponseTime, AvailabilityFactor, number of ScalabilityNodes, and number of RedundancyNodes; and constraints comprising DomainConstraints and OperationalConstraints;

identifying a corresponding provision model based on said first match;

identifying a closest candidate provision model as a second match; and entering said second match into a dynamic provisioning plan customizer and validator.

* * * * *